(No Model.)

E. D. & S. C. CLARK.
HUB FOR VEHICLE WHEELS.

No. 405,872. Patented June 25, 1889.

WITNESSES
F. J. F. Johnson
Chas. S. Kalb

INVENTORS:
E. D. Clark & S. C. Clark
By J. N. Kalb
their Attorney

UNITED STATES PATENT OFFICE.

EDWARD D. CLARK AND SIMMION C. CLARK, OF EVERGREEN, TEXAS.

HUB FOR VEHICLE-WHEELS.

SPECIFICATION forming part of Letters Patent No. 405,872, dated June 25, 1889.

Application filed April 27, 1889. Serial No. 308,819. (No model.)

*To all whom it may concern:*

Be it known that we, EDWARD D. CLARK and SIMMION C. CLARK, citizens of the United States, residing at Evergreen, in the county of San Jacinto and State of Texas, have invented certain new and useful Improvements in Hubs for Vehicle-Wheels; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in hubs for vehicle-wheels, and has for its object the provision of a simple and effective separable hub composed of the fewest possible number of parts and capable of resisting strain in every direction.

Our hub is made with a central box for receiving the axle-spindle, and having a central enlargement or collar on its outer side. The two body portions of the hub are set upon the box and fit up against the collar. They are provided on their opposing faces with lugs, which form the spoke-mortises, and are made plane and straight on one side, while the other side is inclined and formed on such a curve as to make the spoke-mortises the same width at the eye as at the periphery of the hub when the two parts are pressed. The curve and inclination on the sides of the lugs which meet also serve to compress the spokes and to lock the hub and spokes against yielding sidewise when strained, thus holding the spokes firmly and making a strong tight wear-resisting hub and wheel. Around each hub-piece outside of the lugs we provide a peripheral flange, which is provided with openings between the spokes, through which bolts are passed and held from turning by having squared portions which fit into similar-shaped openings in one flange, and are provided with nuts upon their opposite ends, by which they are drawn together, thereby compressing the ends of the spokes by reason of the inclines on the faces of the body portions, the compression thereby serving to regulate the size of the spoke-mortises.

The following detailed description will more fully disclose the nature and purpose of our said invention and the manner in which we construct and use the same.

The accompanying drawings illustrate what we consider the best means for carrying our invention into practice.

Figure 1:
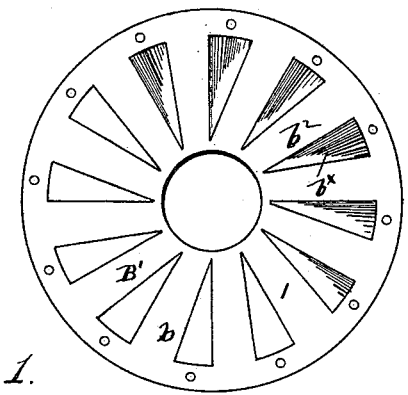
Figure 2:
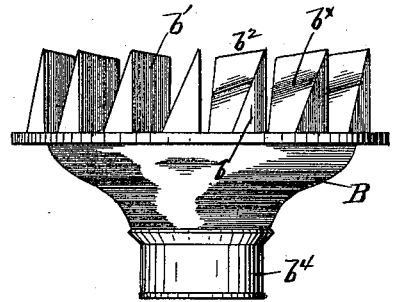
Figure 3:
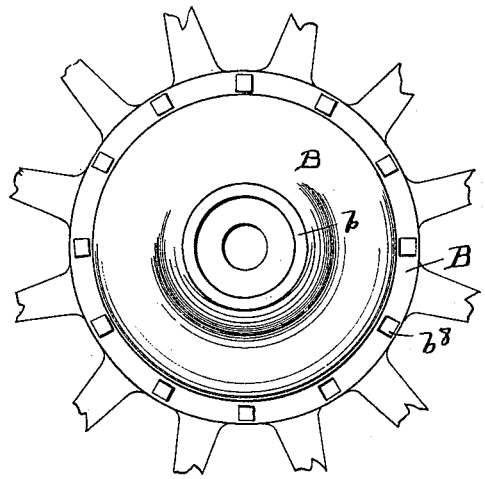
Figure 4:
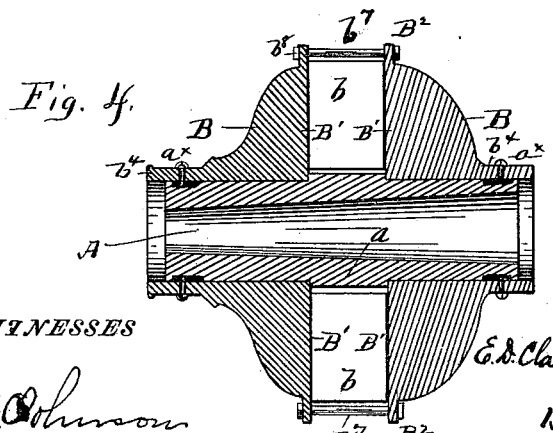

Figure 1 is a plan view of one-half of the hub. Fig. 2 is a side elevation of the same. Fig. 3 is a face view of one end of the hub. Fig. 4 is a longitudinal section.

Similar letters of reference indicate corresponding parts in all the figures where they occur.

A is the bushing or box on which the body portions B B of the hub are secured. The box is provided with a central enlargement or collar $a$, against the ends of which the body portions B B abut when they are fully pressed upon the spokes. When thus fully pressed upon the spokes, the body portions are fastened to the box by screws $a^*$. The body portions B B have faces B' B', on each of which are a series of wedge-shaped lugs $b\ b$, which have one side $b'\ b'$ flat and straight and the other side tapered from the top and inner knife-edges (marked $b^2$ and $b^3$, respectively) to the bottom and outer edges of the lugs, as shown, thus making a compound incline on the faces or sides $b^*$, which fit against similar inclines on the opposing faces of the lugs on the other body portion. The shape of the lugs and the inclines is such as to make a spoke-mortise of uniform size from center to circumference of the body portions, or a little smaller at the circumference than at the center in order to clinch the spokes tightly. The inclines, shaped as they are, serve to brace the two body portions and prevent them from slipping or yielding in any direction when they are clamped together, as will presently be explained. The diminished ends $b^4\ b^4$ of the body portions have screws $a^\times\ a^\times$ let through them and engaging elongated depressions in the box or bushing to hold these parts from relative movement circularly.

The portions B B are provided with annular flanges $B^2$ $B^2$, which are provided with apertures $b^6$ $b^6$, through which the bolts $b^7$ are passed, extending between the spokes, and are tightened up by nuts $b^8$ to compress the body portions and tighten upon the spokes.

Having thus described our invention, what we claim, and desire to secure by Letters Patent, is—

A hub consisting of a cylindrical box having a central collar or enlargement and elongated depressions in the ends, the body portions having the wedge-shaped lugs upon their faces, and the extended flanges for receiving the holding bolts and the screws in the diminished ends thereof, as set forth.

In testimony whereof we affix our signatures in presence of two witnesses.

EDWARD D. CLARK.
SIMMION C. CLARK.

Witnesses:
J. M. HANSBRO,
G. W. McKELLAR.